(12) United States Patent
Shirakawa

(10) Patent No.: US 11,789,376 B2
(45) Date of Patent: Oct. 17, 2023

(54) OPTICAL SCANNING DEVICE AND IMAGE FORMING APPARATUS

(71) Applicant: CANON KABUSHIKI KAISHA, Tokyo (JP)

(72) Inventor: Chihiro Shirakawa, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/458,788

(22) Filed: Aug. 27, 2021

(65) Prior Publication Data

US 2022/0100119 A1  Mar. 31, 2022

(30) Foreign Application Priority Data

Sep. 25, 2020 (JP) ................................. 2020-161033

(51) Int. Cl.
  *G03G 15/04*  (2006.01)
  *G02B 26/12*  (2006.01)
  *G02B 26/08*  (2006.01)

(52) U.S. Cl.
  CPC ... *G03G 15/04036* (2013.01); *G02B 26/0816* (2013.01); *G02B 26/121* (2013.01)

(58) Field of Classification Search
  CPC  G02B 26/0816; G02B 26/121; G02B 26/124; G03G 15/04036; G03G 15/04072
  See application file for complete search history.

(56) References Cited

U.S. PATENT DOCUMENTS

| 10,303,081 B2 * | 5/2019 | Ishidate ............... G02B 26/125 |
| 10,845,727 B2 * | 11/2020 | Obara ............... G03G 15/04072 |
| 2016/0309053 A1 | 10/2016 | Murotani et al. |
| 2018/0234565 A1 * | 8/2018 | Imai ..................... G02B 26/124 |

FOREIGN PATENT DOCUMENTS

| JP | 2004-037836 A | 2/2004 |
| JP | 4125057 B | 7/2008 |
| JP | 2009-198883 A | 9/2009 |
| JP | 2014-134781 A | 7/2014 |
| JP | 2018-132643 A | 8/2018 |
| JP | 2018-134781 A | 8/2018 |

\* cited by examiner

*Primary Examiner* — Hoang X Ngo
(74) *Attorney, Agent, or Firm* — Venable LLP

(57) ABSTRACT

An optical scanning device includes a plurality of light source units and a casing of the optical scanning device. The plurality of light source units includes a light source and a holder for holding the light source, respectively. The casing includes a plurality of mounting surfaces for holding a cylindrical portion of the holder. Each of the holders includes two projecting portions at one end portion of the holder with respect to a direction of a central axis of the cylindrical portion, perpendicular to the central axis of the cylindrical portion and extending in a direction away from the central axis each other when viewing the light source unit in the axial direction of the central axis, the projecting portions being provided with a U-shaped cut-way portion, respectively.

18 Claims, 6 Drawing Sheets

OPTICAL SCANNING DEVICE AND IMAGE FORMING APPARATUS

FIELD OF THE INVENTION AND RELATED ART

The present invention refers to an optical scanning device and an image forming apparatus equipped with the optical scanning device.

It is known that an optical scanning device installed in an electrophotographic type image forming apparatus has the following structure. The optical scanning device is equipped with a laser unit consisting of a laser diode as a light source, a collimator lens, a holder for the laser diode and collimator lens, and an optical deflector that deflects the laser beam emitted from the laser unit. Furthermore, the optical scanning device is equipped with optical elements such as lenses and mirrors so that the laser beam deflected by the optical deflector forms a latent image on the scanning surface. In the case of color image forming apparatus that forms color images on recording material, an optical scanning device with multiple laser diodes mounted in one housing is used. In order to achieve high image quality and high productivity, multi-beam laser diodes are used as the light source of the optical scanning device, with each laser diode having multiple light emitting points.

For example, in Japanese Laid-Open Patent Application No. 2018-132643, an optical scanning device is proposed in which four multi-beam laser diodes are installed in one casing. As described in No. 2018-132643, the multi-beam laser diodes are installed in the casing after the spacing between the scanning positions on the photosensitive drum, which is the scanning surface of the laser beam emitted from each light source (hereinafter referred to as the beam pitch), is adjusted according to the resolution of the image. The adjustment of the beam pitch of the laser beam emitted by the multi-beam laser diode is performed by rotating the laser unit, which is mounted on the casing so that it can rotate around the optical axis of the collimator lens, by applying a moment to the adjustment protrusion on the holder.

For example, in Japanese Laid-Open Patent Application No. 2004-37836, a method of holding a laser unit in a casing so that it can be easily rotated around the optical axis of the lens is proposed. In the said Japanese Laid-Open Patent Application No. 2018-132643, an intermediate member is required between the laser unit and the casing, but in the Japanese Laid-Open Patent Application No. 2004-37836, the laser unit of cylindrical shape is directly urged to the mounting surface of the casing using an elastic member. The configuration proposed in Japanese Laid-Open Patent Application No. 2004-37836 holds the laser unit directly to the casing without an intermediate member, which improves mounting accuracy and reduces product cost.

In recent years, as image forming apparatuses have become smaller, there has been a need for further miniaturization of the optical scanning devices. However, the conventional method of holding the laser unit in the casing as described above has the following issues. In the configuration proposed in Japanese Laid-Open Patent Application No. 2018-132643 described above, the two laser units are mounted at different positions in the direction of the optical axis of the lens thus not contributing to miniaturization of the optical scanning device.

In addition, Japanese Laid-Open Patent Application No. 2004-37836 does not mention a method of adjusting the beam pitch of the laser beam of a laser unit using a multi-beam laser diode, but in fact in order to reduce the size of the optical scanning device, it is necessary to place the laser units even closer to each other. However, when the holder of the laser unit that holds the multi-beam laser diode and collimator lens has a projecting portion for adjustment, the size of the projecting portion and the location of the laser unit are limited due to space constraints. For example, if the adjustment projecting portion is shortened, a larger force must be applied to the adjustment projecting portion in order to rotate the laser unit. As a result, the laser unit is subjected to a large force in a direction different from the direction of the force applied to the mounting surface during adjustment, which may cause the mounting posture to collapse and prevent accurate adjustment of the beam pitch. In addition, if the pressure applied to the mounting surface is increased, the holder of the laser unit may be deformed, and the beam angle of the laser beam may change.

The present invention was made under these circumstances, and aims to reduce the size of the optical scanning device.

SUMMARY OF THE INVENTION

According to an aspect of the present invention, there is a provided an optical scanning device for irradiating a scanned surface with a light beam, said optical scanning device comprising: a plurality of light source units, said plurality of light source units including a light source having a plurality of light emitting points for emitting the light beam and a holder for holding said light source, respectively; and a casing of said optical scanning device for holding said plurality of light source units, said casing including a plurality of mounting surfaces for holding a cylindrical portion of said holder of each of said plurality of light source units, respectively, wherein each of said holders includes two projecting portions, at one end portion of said holder with respect to a direction of a central axis of said cylindrical portion, projecting perpendicular to the central axis of said cylindrical portion and extending in a direction away from the central axis each other when viewing said light source unit in the axial direction of the central axis, said projecting portions being provided with a U-shaped cut-way portion, respectively.

Further features of the present invention will become apparent from the following description of exemplary embodiments (with reference to the attached drawings).

DESCRIPTION OF THE EMBODIMENTS

The following is a detailed description of the embodiment of the present invention with reference to the drawings.

EMBODIMENT

[Configuration of the Image Forming Apparatus]

Figure 1:
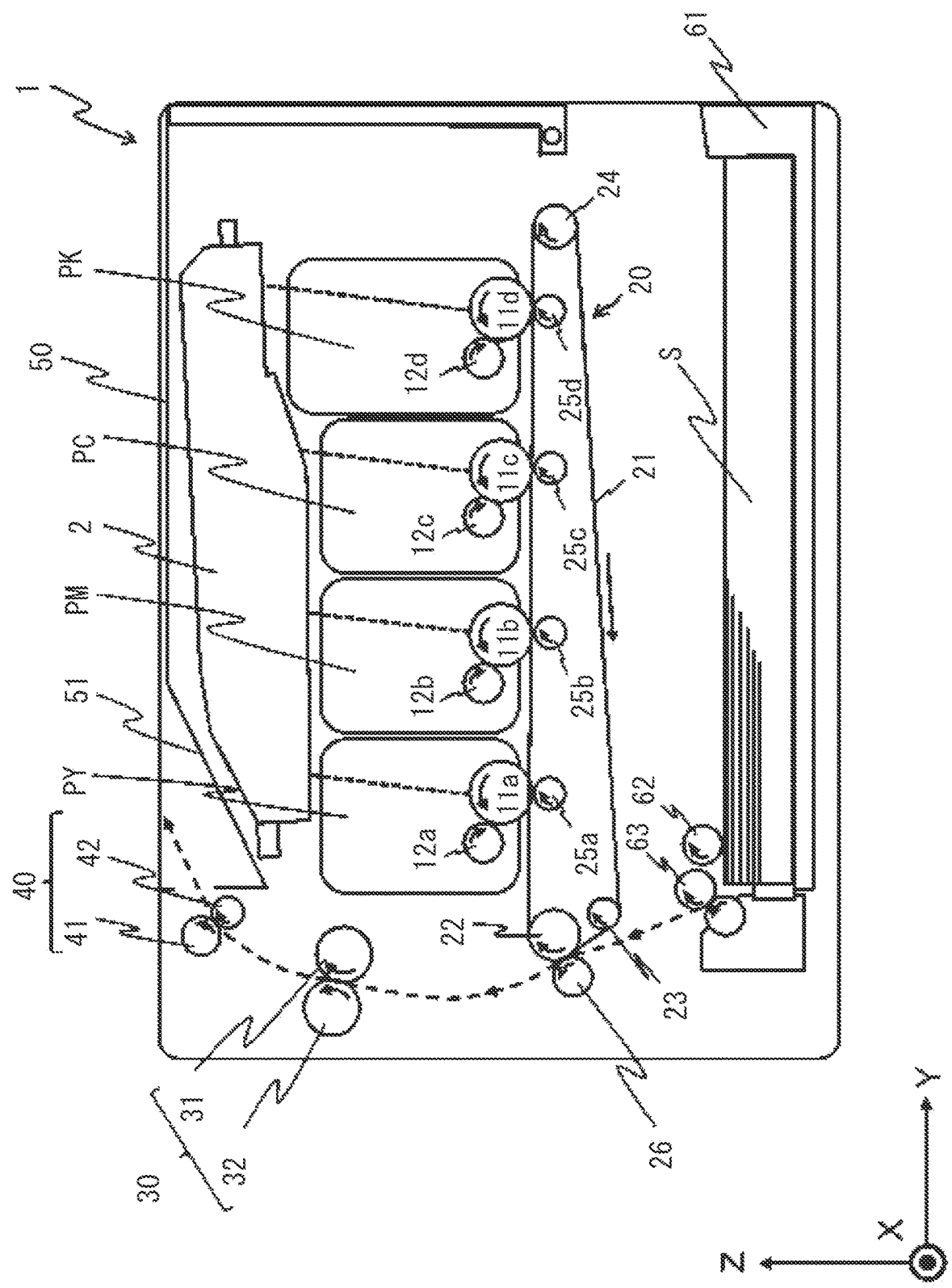
FIG. 1 is a cross-sectional view showing the configuration of the image forming apparatus of the embodiment.

FIG. 1 shows a cross-sectional view of an electrophotographic type image forming apparatus 1. As shown in FIG. 1, four process cartridges, PY, PM, PC, and PK, are arranged horizontally in the image forming apparatus. The process cartridges PY, PM, PC, and PK contain toner of yellow (Y), magenta (M), cyan (C), and black (K) colors, respectively. Since the toner capacity of the process cartridge PK is larger than that of the other process cartridges PY, PM, and PC, its height (length in the Z-axis direction in the figure) is larger. In the process cartridges PY, PM, PC, and PK, a photosensitive drum 11 (11a, 11b, 11c, 11d), which is an image bearing member, and a developing roller 12 (12a, 12b, 12c, 12d) are integrally arranged, respectively. The developing roller 12 develops the electrostatic latent image by attaching toner to the electrostatic latent image formed on the photosensitive drum 11 (on the photosensitive drum) to form a toner image. As shown in FIG. 1, each of the process cartridges PY, PM, PC, and PK has the same configuration. The a, b, c, and d at the end of the code correspond to the process cartridges PY, PM, PC, and PK, respectively. In the following, the a, b, c, and d at the end are omitted unless they refer to a specific color member.

An optical scanning device 2 is located above the process cartridges PY, PM, PC, and PK in the figure. The optical scanning device 2 irradiates a laser beam (light beam) based on image information to the photosensitive drum 11 of each process cartridge PY, PM, PC, and PK, and forms an electrostatic latent image on the surface of the photosensitive drum 11. On the other hand, an intermediate transfer belt unit 20 is located below the process cartridges PY, PM, PC, and PK in the figure. The intermediate transfer belt unit 20 consists of an intermediate transfer belt 21, a drive roller 22, a tension roller 23, and a driven roller 24. As shown in FIG. 1, the intermediate transfer belt 21 is stretched by the drive roller 22, tension roller 23, and driven roller 24, and rotates in the arrow direction (clockwise direction) in the figure.

A primary transfer roller 25 is located below the photosensitive drum 11 of each process cartridge PY, PM, PC, and PK, in a position facing the photosensitive drum 11. The intermediate transfer belt 21 is urged to the photosensitive drum 11 by the primary transfer roller 25. The toner images on the photosensitive drum 11 of each process cartridge PY, PM, PC, and PK are sequentially superimposed on the intermediate transfer belt 21 and transferred to form color images. The drive roller 22 is in contact with a secondary transfer roller 26 through the intermediate transfer belt 21, and the color image on the intermediate transfer belt 21 is transferred to a recording material S fed from a sheet feeding tray 61.

A fixing unit 30 and a discharging unit 40 are located in the image forming apparatus 1. The fixing unit 30 has a fixing film 31 that heats the color image transferred to the recording material S, and a pressure roller 32 that pressurizes the recording material S. Each of these rollers rotates in the direction of the arrow in the figure to convey the recording material S. By doing so, the color image is fixed onto the recording material S. On the other hand, the discharging unit 40 has a discharging roller 41 and a discharging roller 42, and discharges the recording material S conveyed from the fixing unit 30 to a stacking tray 50 provided on the upper surface of the image forming apparatus 1 and having a slope portion 51.

In each of the process cartridges PY, PM, PC, and PK, the photosensitive drum 11 is rotated during image formation, and the surface of the photosensitive drum 11 is charged to a uniform potential by the charging roller (not shown). Then, the photosensitive drum 11, which is charged to a uniform potential, is irradiated with a laser beam (indicated by a dashed line in the figure) corresponding to the image information from the optical scanning device 2, and exposure is performed. As a result, an electrostatic latent image is formed on the surface of the photosensitive drum 11, and the formed electrostatic latent image is developed by the developing roller 12 to form a toner image of each color. Then, the toner images on the photosensitive drum 11 are sequentially superimposed and transferred onto the intermediate transfer belt 21 to form a color image.

On the other hand, the recording material S, which is the recording medium stacked in a sheet feeding tray 61 of the sheet feeding device 60, is fed by a sheet feeding roller 62 rotating in the arrow direction (clockwise direction) in the figure. The overlapped recording material S is separated by a separation roller 63 and conveyed. Then, the recording material S is fed to the nipping portion where the drive roller 22 and the secondary transfer roller 26 come into contact with each other, and in the nipping portion, the color image formed on the intermediate transfer belt 21 is transferred to the fed recording material S. After that, the recording material S with the transferred color image is conveyed to the nipping portion where the fixing film 31 and the pressure roller 32 of the fixing unit 30 contact each other, and is heated and pressurized to fix the transferred color image on the recording material S. The recording material S with the color image fixed is discharged to the stacking tray 50 by the discharging unit 40 and is stacked in the slope portion 51.

[Configuration of the Optical Scanning Device]

Figure 2:
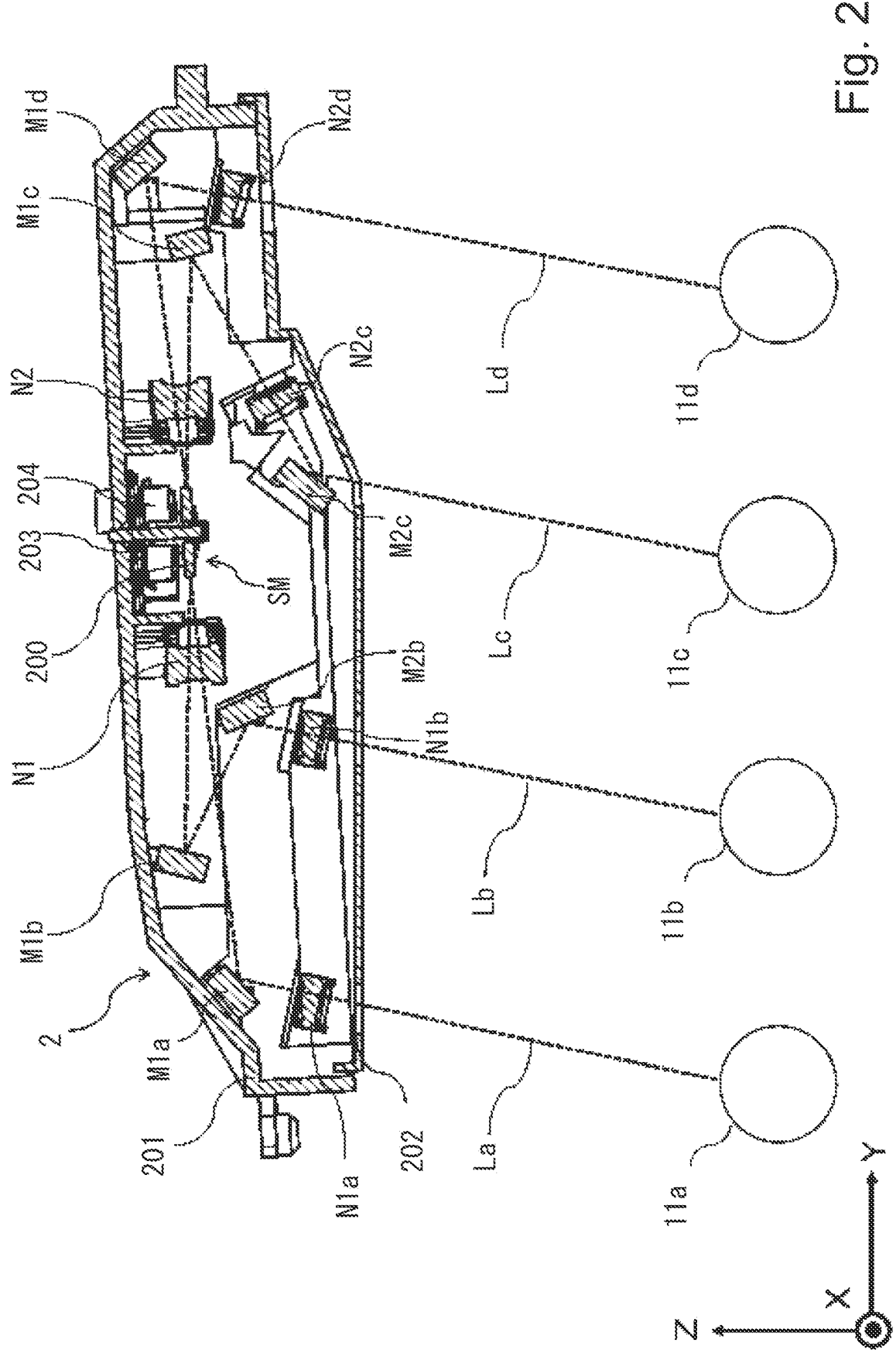
FIG. 2 is a cross-sectional view showing the configuration of the optical scanning device of the embodiment.

FIG. 2 shows a cross-sectional view of the optical scanning device 2 mounted on the image forming apparatus 1 of FIG. 1. The optical scanning device 2 is equipped with a laser unit that emits laser light (not shown), an optical deflector SM that deflects the laser light, and imaging lenses and reflecting mirrors that guide the laser light deflected by the optical deflector SM onto the photosensitive drum 11 of each process cartridge PY, PM, PC, and PK. In the optical scanning device 2, an optical deflector SM is placed in the center of the casing (also called an optical box) 201 as shown in FIG. 2. The optical deflector SM has a rotating polygon mirror 200 that deflects the laser beam incident from the laser unit, a rotor portion 204 that is a driver portion that drives the rotating polygon mirror 200, and a motor drive substrate 203 on which the rotor portion 204 is mounted.

In FIG. 2, on the left side of the light deflector SM, the first image forming lens N1, the second image forming lenses N1a, N1b, and the first and second reflecting mirrors M1a, M1b, and M2b, which transmit the laser beam and reflect the laser beam, are arranged. On the other hand, on the right side of the light deflector SM, the first imaging lens N2, the second imaging lenses N2c. N2d, and the first reflecting mirrors M1c, M1d, and M2c, which transmit the laser beam and reflect the laser beam, are arranged. The said light deflector SM, each imaging lens, and each reflecting mirror are fixed inside the casing 201, and the inside of the casing 201 is set in a sealed state by attaching the casing cover 202, which seals the open portion of the casing 201.

On the front side of the optical scanning device 2 shown in FIG. 2, there is a laser unit (not shown) that emits a laser beam to form an electrostatic latent image on the photosensitive drum 11 of each process cartridge PY, PM, PC, and PK, and exposes the photosensitive drum 11. The laser unit is provided for each photosensitive drum 11 of process cartridges PY, PM, PC, and PK. The laser beam La emitted from the laser unit corresponding to the photosensitive drum 11*a* of the process cartridge PY is deflected by the rotating polygon mirror 200 of the optical deflector SM, and enters the first imaging lens N1. The laser beam La transmitted through the first imaging lens N1 is reflected by the first reflecting mirror M1*a*. The laser beam La reflected by the first reflecting mirror M1*a* passes through the second imaging lens N1*a*, the exit port on the casing cover 202, and scans the photosensitive drum 11*a*.

The laser beam Lb emitted from the laser unit corresponding to the photosensitive drum 11*b* of the process cartridge PM is deflected by the rotating polygon mirror 200 of the optical deflector SM and enters the first imaging lens N1. The laser beam Lb transmitted through the first imaging lens N1 is reflected by the first reflecting mirror M1*b*. The laser beam Lb reflected by the first reflecting mirror M1*b* is then reflected by the second reflecting mirror M2*b*. The laser beam Lb reflected by the second reflecting mirror M2*b* passes through the second imaging lens N1*b*, the exit port on the casing cover 202, and scans the photosensitive drum 11*b*.

The laser beam Lc emitted from the laser unit corresponding to the photosensitive drum 11*c* of the process cartridge PC is deflected by the rotating polygon mirror 200 of the optical deflector SM and enters the first imaging lens N2. The laser beam Lc transmitted through the first imaging lens N2 is reflected by the first reflecting mirror Mic. The laser beam Lc reflected by the first reflecting mirror Mic enters the second imaging lens N2*c*. The laser beam Lc transmitted through the second imaging lens N2*c* is reflected by the second reflecting mirror M2*c*, passes through the exit port provided on the casing cover 202, and scans the photosensitive drum 11*c*.

The laser light Ld emitted from the laser unit corresponding to the photosensitive drum 11*d* of the process cartridge PK is deflected by the rotating polygon mirror 200 of the optical deflector SM and enters the first imaging lens N2. The laser beam Ld transmitted through the first imaging lens N2 is reflected by the first reflecting mirror M1*d*. The laser beam Ld reflected by the first reflecting mirror M1*d* passes through the second imaging lens N2*d*, the exit port on the casing cover 202, and scans the photosensitive drum 11*d*.

[Configuration of the Laser Unit]

Figure 3:
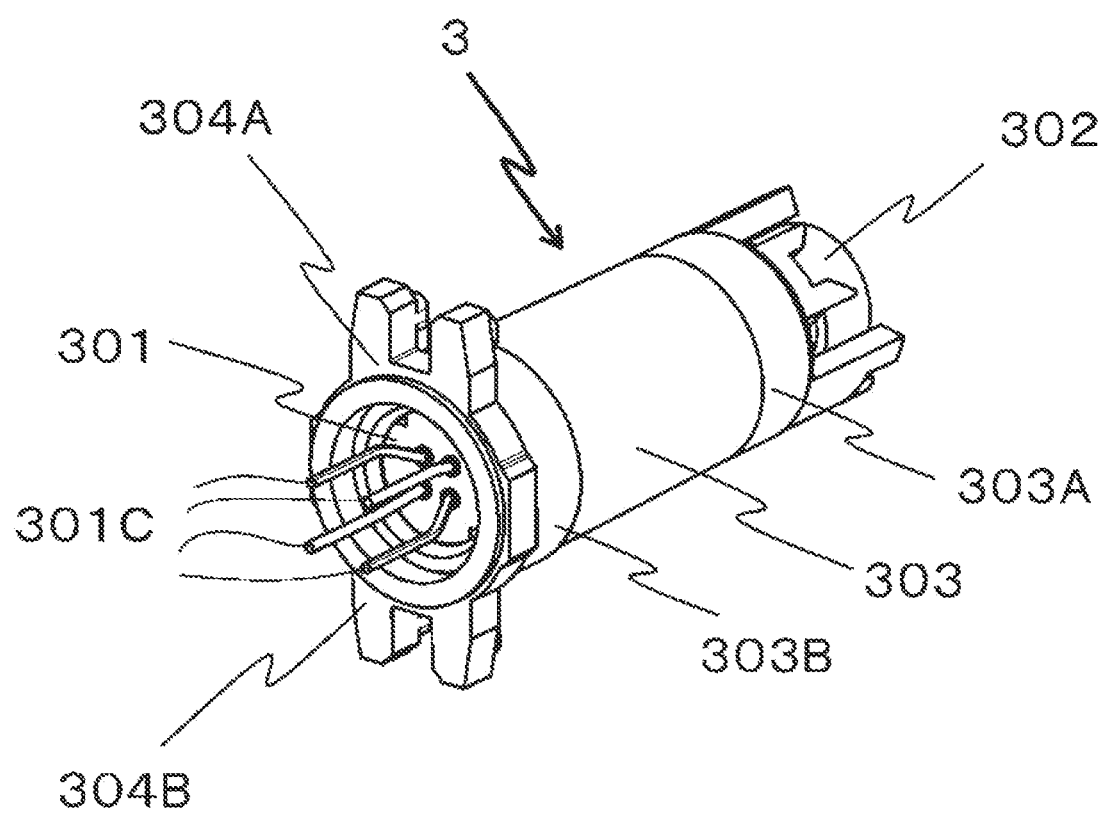
FIG. 3 is a perspective view of the laser unit of the embodiment.

FIG. 3 is a schematic diagram view of the laser unit 3, which is a light source unit with a light source that emits laser light. The laser unit 3 consists of a two-beam laser diode with two light emitting points (hereinafter referred to as "light source") 301, a collimator lens 302, and a holder 303. The holder 303 has a cylindrical shape with a hollow interior, and the collimator lens 302 is mounted on one end portion, and the other end portion has protrusions 304A and 304B for position adjustment, which are extended in the direction perpendicular to the cylindrical axis (central axis of the holder 303, which is the cylindrical portion) which is described below. The central portions of the protrusions 304A and 304B, which are projecting portions, are provided with U-shaped cut-way portion for grasping the laser unit 3 with the beam pitch adjusting tool of the laser unit 3 to be described later. Furthermore, a through hole (not shown) is provided in the center of the end portion side of the holder 303 where the protrusions 304A and 304B are provided, for press fitting the light source 301.

The holder 303 has cylinder side portions 303A and 303B that contact the mounting surface of the casing 201 that holds the laser unit 3 when the laser unit 3 is installed on the casing 201 of the optical scanning device 2. The light source 301 is press-fitted into the holder 303 from the front side in the figure in the depth direction and fixed to the holder 303. At this time, the light source 301 is fixed to the holder 303 at a position where the beam pitch adjustment error, which will be described later, is about a few degrees (e.g., about 2 or 3 degrees). The four terminals protruding from the light source 301 in the foreground direction in the figure are the lead terminals 301C of the light source 301. On the other hand, the collimator lens 302 is attached to the end portion opposite to the end portion of the holder 303 in which the light source 301 is press-fitted, and is fixed with adhesive after the position adjustment to the light source 301 is completed.

[Mounting of the Laser Unit on the Casing]

Figure 4:
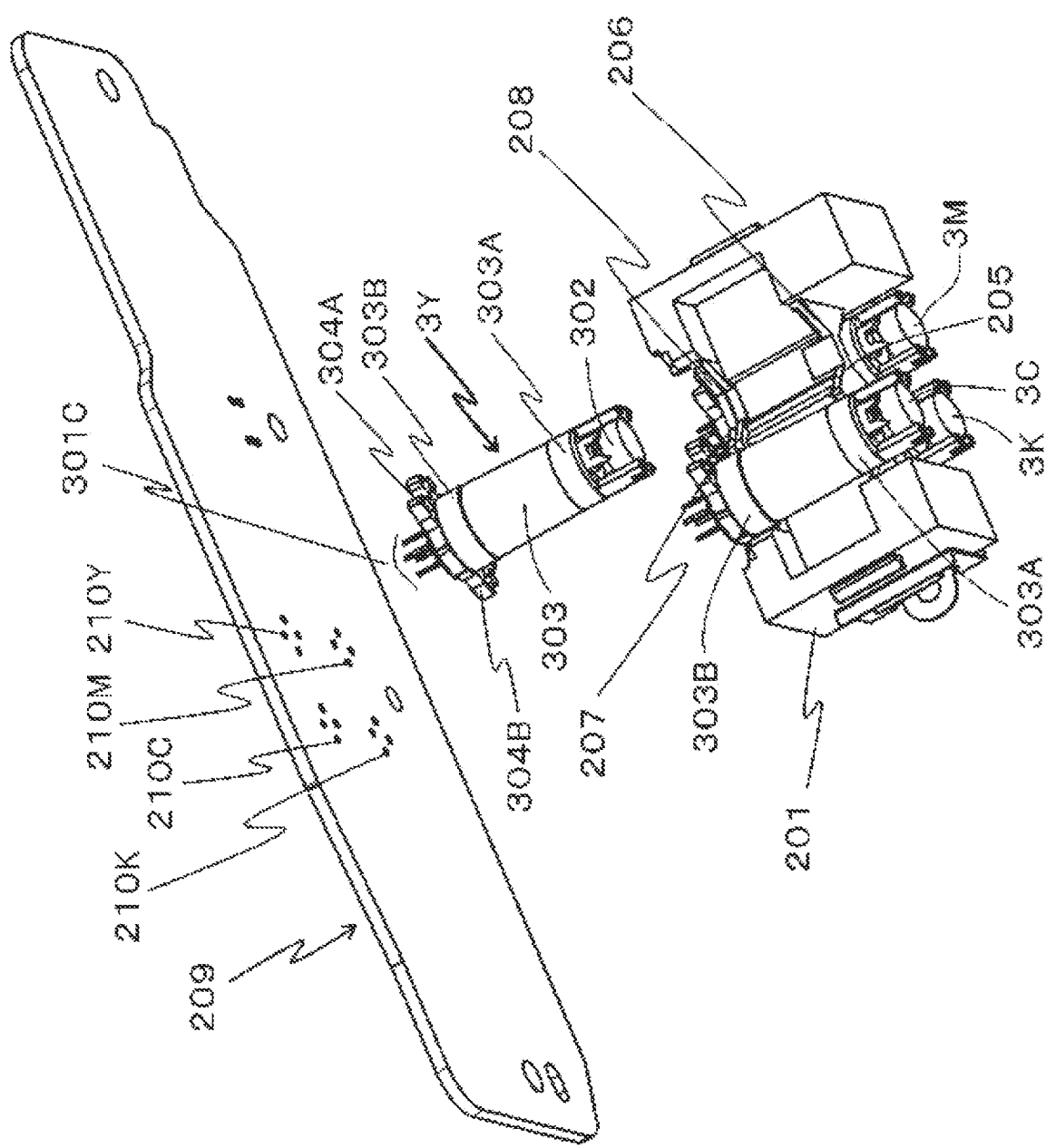
FIG. 4 is a view illustrating the mounting method of the embodiment's laser unit on the casing of the optical scanning device.

Next, the method of installing the laser unit 3 to the casing 201 will be explained. FIG. 4 is a diagram of a laser unit 3 that irradiates a laser beam to the photosensitive drum 11 of process cartridges PY, PM, PC, and PK, installed on the casing 201. The four laser units 3Y, 3M, 3C, and 3K shown in FIG. 4 represent the laser units 3 that irradiate the laser beam to the photosensitive drum 11 of the process cartridges PY, PM, PC, and PK, respectively. In FIG. 4, only a part of the casing 201 shown in FIG. 2 is shown. To explain the configuration of the casing 201 where the laser unit 3 is installed, FIG. 4 shows the laser unit 3Y removed from the casing 201 and the laser units 3M, 3C, and 3K installed in the casing 201. In FIG. 4, the laser unit 3Y has the collimator lens 302 mounted on one end portion of the holder 303, and the light source 301 (not shown) is fixed on the end portion of the side with the protrusions 304A and 304B. The four lead terminals 301C of the light source protrude from the control board 209. The control board 209 has through holes 210Y, 210M, 210C, and 210K into which the lead terminals 301C of the light source 301 of the laser units 3Y, 3M, 3C, and 3K are inserted.

The mounting portion where the laser unit 3Y of the casing 201 is installed has a trapezoidal shape consisting of two opposing slopes (mounting surfaces) and a flat plane connecting the two slopes (mounting surfaces). In detail, as shown in FIG. 4, in the mounting portion where the laser unit 3Y of the casing 201 is installed, the mounting surfaces 205 and 206 are provided on the mounting portion where the cylinder side portion 303A of the laser unit 3Y is mounted. On the other hand, mounting surfaces 207 and 208 are provided on the mounting portion where the cylinder side portion 303B is mounted. When the laser unit 3Y is mounted on the casing 201, the cylinder side portion 303A of the holder 303 is in contact with the mounting surfaces 205 and 206, and the cylinder side portion 303B is in contact with the mounting surfaces 207 and 208. The holder 303 is then urged in the direction of the mounting surfaces 205, 206, 207, and 208 of the casing by an elastic member (spring) 211 (see FIG. 5 and FIG. 6). The laser unit 3Y is held in the casing 201 such that the holder 303 can be rotated around the cylindrical axis by sliding the cylinder side portions 303A, 303B on the mounting surfaces 205, 206, 207, 208. When the laser unit 3Y is mounted on the casing 201, one of the protrusions 304A and 304B abuts against the casing 201, thereby positioning the laser unit 3Y in the direction of the cylindrical axis.

Here, we have explained how the laser unit 3 is mounted on the casing 201 using the laser unit 3Y, but other laser units 3M, 3C, and 3K can be mounted on the casing 201 in the same way. As shown in FIG. 4, each mounting portion is arranged in a grid pattern, but the position of the mounting portion of the casing 201 to which the laser unit 3 is mounted is different between laser units 3Y and 3C and laser units 3M and 3K. The mounting portions (mounting surfaces 205 to 208) of the casing 201 on which the laser units 3Y and 3C are mounted are located below the laser units 3Y and 3C in the figure. On the other hand, the mounting portions (mounting surfaces 205 to 208) of the casing 201 to which the laser units 3M and 3K are mounted are located above the laser units 3M and 3K in the figure.

Each laser unit 3 attached to the casing 201 is fixed to the casing 201 with adhesive after the beam pitch in the sub-scanning direction (rotation direction of the photosensitive drum), which will be described later, is adjusted to be within a predetermined range. After the four laser units 3 are fixed with adhesive, the control board 209 of the optical scanning device 2 is fixed to the casing 201 with the lead terminal 301C of the corresponding light source 301 inserted into the through hole 210 provided on the control board 209. Then, the lead terminal 301C of the light source 301 is soldered to the control board 209.

[Laser Unit Layout Configuration]

Figure 5:
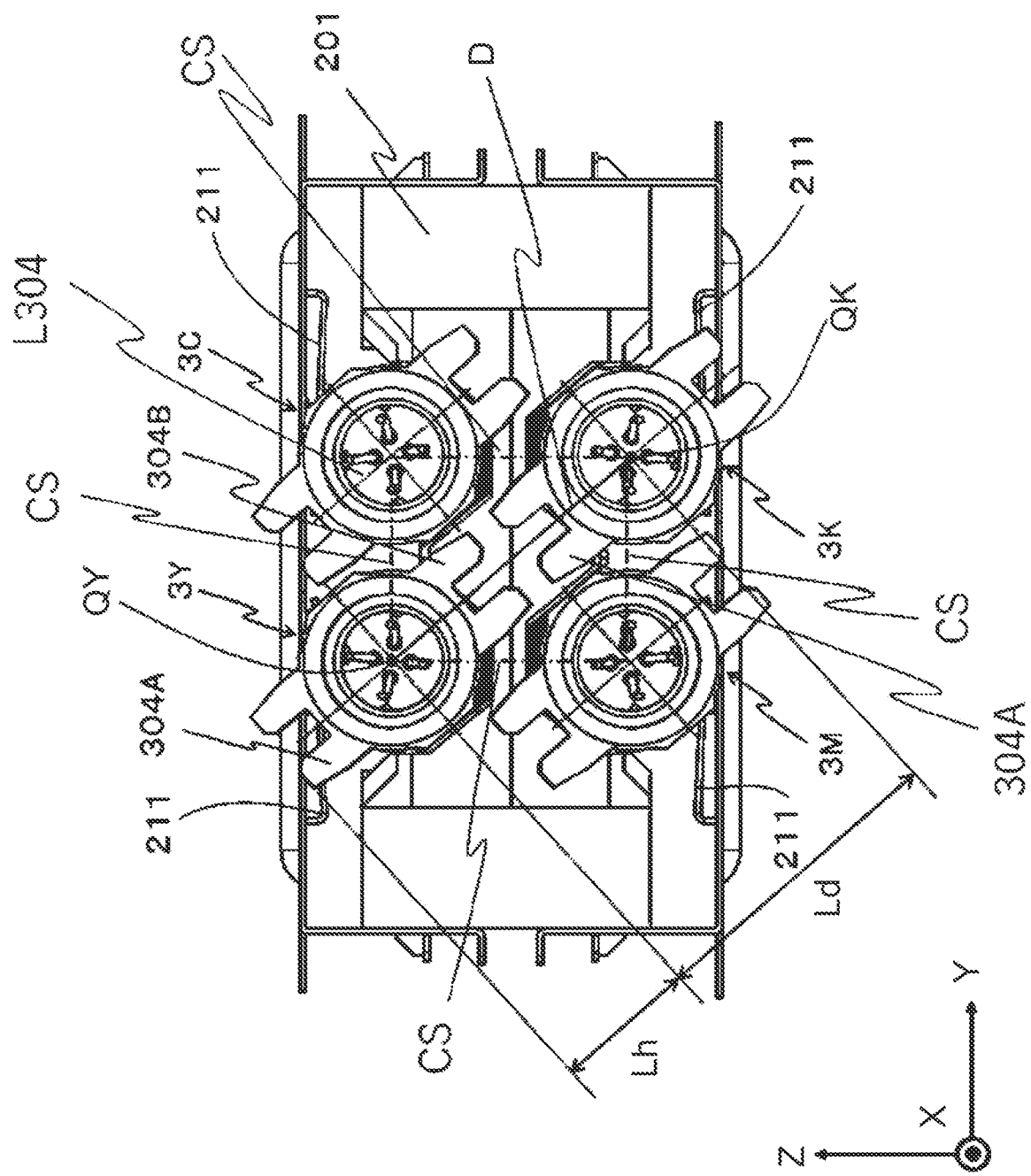
FIG. 5 is a diagram view illustrating the laser unit installed in the casing of the optical scanning device of the embodiment.

FIG. 5 shows a view of the laser units 3 (3Y, 3M. 3C, 3K) mounted on the casing 201 from the lead terminal 301C side of the light source 301, with the control board 209 removed in FIG. 4. In FIG. 5, it can be seen that the holder 303 of the laser unit 3 is urged in the direction of mounting surface 205, 206, 207, 208 by the elastic member 211.

As shown in FIG. 5, by installing the four laser units 3Y, 3M, 3C, and 3K in close proximity to each other in the Z-axis and Y-axis directions, the capacity of the casing 201 occupied by the laser units 3 can be reduced and the optical scanning device 2 can be made smaller. Therefore, in this embodiment, the laser units 3Y, 3M. 3C, and 3K are arranged so that the rectilinear line CS connecting the centers of the cylindrical axes of the holders 303 of the laser units 3 adjacent to each other in the Z-axis and Y-axis directions forms a square or rectangle. Furthermore, in FIG. 5, the rectilinear line L304 connecting the protrusions 304A and 304B of each laser unit 3 is inclined to any of the four rectilinear lines CS. In detail, the laser units are installed in the casing 201 so that the rectilinear line L304 connecting the protrusions 304A and 304B of each laser unit 3 is parallel to the rectilinear line D connecting the centers of the cylindrical axes of the holders 303 of the laser units 3Y and 3K in the diagonal direction among the adjacent laser units 3. As a result, the area enclosed by the laser units 3 can be effectively utilized as the placement area for the protrusions 304A and 304B for position adjustment, which will be described later, and more compact size of the optical scanning device 2 can be realized. Also, at this time, the following restrictions are placed on the length Lh from the center of the cylindrical axis of the holder 303 of the laser unit 3 to the tips of the protrusions 304A and 304B to prevent contact between the protrusions 304B of the laser unit 3Y and 304A of the laser unit 3K. That is, in FIG. 5, if the length from the center of the cylindrical axis QY of the holder 303 of laser unit 3Y to the center of the cylindrical axis QK of the holder 303 of laser unit 3K is Ld, a relationship is established in which the length Lh is shorter than ½ (half) of the length Ld (Lh<Ld/2).

Each laser unit 3 may be installed in the casing 201 so that the rectilinear line L304 connecting the protrusions 304A and 304B is parallel to the rectilinear line connecting the centers of the cylindrical axes of the holders 303 of the laser units 3C and 3M in the diagonal direction among the adjacent laser units 3.

[Adjustment of Beam Pitch of Light Source]

Figure 6:
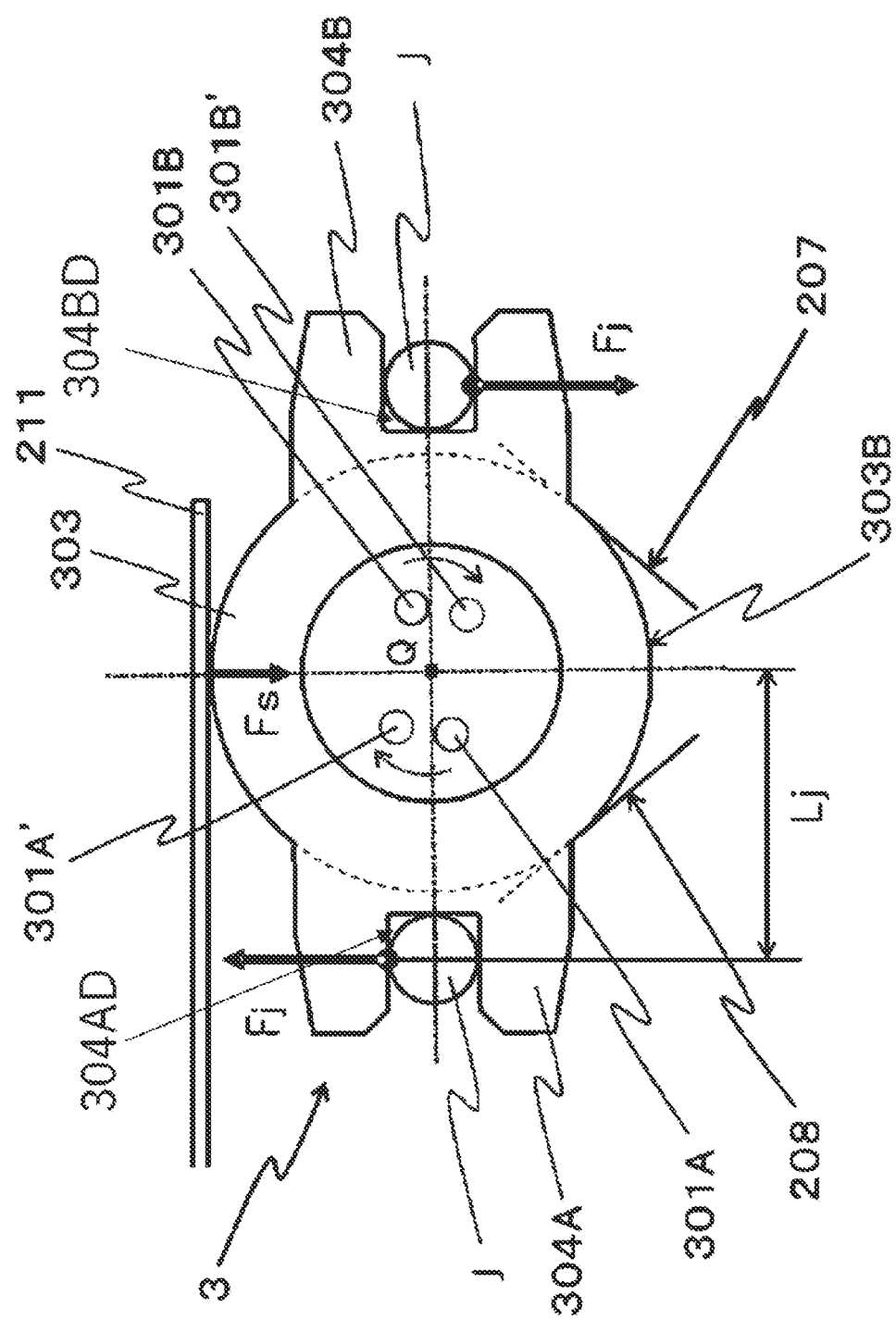
FIG. 6 is a view illustrating how to adjust the beam pitch of the embodiment's laser unit.

FIG. 6 is a schematic diagram to explain how to adjust the beam pitch of the laser unit 3. In FIG. 6, the laser unit 3 is installed on the mounting portion of the casing 201, and the elastic member 211 urges it in the direction of the mounting portion of the casing 201. In detail, the cylinder side portion 303B of the holder 303 of the laser unit 3 is in contact with the mounting surfaces 207 and 208 of the casing 201, and the cylinder side portion 303A (not shown) is in contact with the mounting surface 205 (not shown) and 206 (not shown) of the casing 201. Then, by means of the elastic member 211, the cylinder side portions 303A and 303B of the holder 303 of the laser unit 3 are urged in the direction of the mounting surfaces 205, 206, 207, and 208 of the casing 201.

The light source 301 in this embodiment is a multi-beam laser diode with two light emitting points 301A and 301B. After adjusting the beam pitch (scanning position interval) of the laser beam emitted from each light emitting point of the light source 301 on the photosensitive drum 11 according to the resolution of the image, the laser unit 3 is fixed to the casing 201 with adhesive. The adjustment of the beam pitch is performed by rotating the laser unit 3, which is urged to the mounting surface 205 (see FIG. 4), 206 (see FIG. 4), 207, 208 of the casing 201 by the force Fs with the elastic member 211, around the cylindrical axis of the holder 303. Specifically, the U-shaped cut-way portions 304AD and 304BD provided in the center of the two oppositely arranged adjustment protrusions 304A and 304B are grasped by an adjusting tool J (hatched circular portion in the figure), and the laser unit 3 is rotated by the adjusting tool J around the cylindrical axis of the holder 303. By doing so, the position of the two light emitting points 301A and 301B of the light source 301, which is press-fitted and fixed to the holder 303, is adjusted.

For example, suppose that the two light emitting points of light source 301 are at positions 301A and 301B in the figure, and the desired light emitting point positions are 301A' and 301B'. In this case, the laser unit 3 is rotated in the direction of the arrow (clockwise) in the figure using the adjusting tool J to adjust the beam pitch. The respective rotation moments M for the projections 304A and 304B when rotating the laser unit 3 can be obtained as follows. That is, the rotation moment M is obtained by the product of the distance Lj from the cylindrical axis center Q of the holder 303 to the contact point where the adjusting tool J contacts the protrusions 304A and 304B, and the force Fj applied by the adjusting tool J to the protrusions 304A and 304B (rotation moment M=distance Lj×Force Fj). If the laser unit 3 is downsized and the protrusions 304A and 304B are shortened, the distance Lj will be shortened, but the required rotation moment M can be obtained by increasing the force Fj to that extent.

When the laser unit 3 is rotated around the cylindrical axis of the holder 303, friction occurs between the mounting surface 205 (see FIG. 4), 206 (see FIG. 4), 207, 208 and the cylinder side portion 303A (see FIG. 4), 303B of the holder 303. When a force Fj is applied to the protrusions 304A and 304B using the adjusting tool J, a force is generated that tries to move the laser unit 3 in a direction other than the direction of rotation of the holder 303. For example, the force Fj on the protrusion 304A side generates a force in the direction to move the holder 303 away from the mounting surface 208. To resist this, if the urging force Fs exerted by the elastic member 211 is made stronger, the force between the cylinder side portions 303A, 303B of the holder 303 and the mounting surface 205, 206, 207, 208, and the cylinder side portions 303A, 303B and the elastic member 211 is increased. As a result, the movement of the laser unit 3 in the rotational direction is hindered. However, in the present embodiment, when rotating the laser unit 3, the adjusting tool J grasps not only the protrusions 304A but also the oppositely arranged protrusions 304B, and can apply a force Fj in the direction opposite to each other. Therefore, it is possible to offset the force that tries to move the laser unit 3 other than in the direction of rotation of the holder 303.

The laser unit 3 of this embodiment is provided with opposing protrusions 304A and 304B for position adjustment around the cylindrical axis of the holder 303. For example, suppose that the distance Lj from the center of the cylindrical axis Q of the holder 303 to the contact point where the adjusting tool J contacts the protrusions 304A and 304B (or the length Lh from the center of the cylindrical axis Q of the holder 303 to the tips of the protrusions 304A and 304B) is shortened in order to reduce the size of the laser unit 3. This makes it possible to rotate the laser unit 3 while maintaining the posture of the holder 303, which is urged to the casing 201 by the elastic member 211, even when the force Fj required to rotate the holder 303 is increased.

In FIG. 6, the holder 303 of the laser unit 3 is placed on the mounting surface 205, 206, 207, 208 of the casing 201 so that the protrusions 304A, 304B are in the horizontal direction instead of the diagonal direction shown in FIG. 5 to illustrate how to adjust the beam pitch. In FIG. 6, the angle to be adjusted is also shown in a large scale to explain the beam pitch adjustment clearly. As shown in FIG. 5, the laser unit 3 is installed so that the protrusions 304A and 304B are in the diagonal direction shown in FIG. 5. The angle of the protrusions 304A, 304B hardly changes before and after the beam pitch adjustment.

As described above, even if the protrusions 304A and 304B on the laser unit 3 are downsized, the optical scanning device 2 can be downsized without degrading the beam pitch adjustment accuracy. In this embodiment, the collimator lens 302 is mounted on the laser unit 3. However, this is not limited to this configuration, and the collimator lens 302 may be fixed by attaching it to the casing 201 after position adjustment with the light source 301.

As described above, this embodiment allows us to downsize the optical scanning device.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-161033 filed on Sep. 25, 2020, which is hereby incorporated by reference herein in its entirety.

What is claimed is:

1. An optical scanning device for scanning scanned surfaces with light beams, the optical scanning device comprising:
a plurality of light source units, each of the plurality of light source units including a light source having a plurality of light emitting points for emitting a light beam and a holder for holding the light source; and
a casing of the optical scanning device for holding the plurality of light source units, the casing including a plurality of mounting surfaces for holding a cylindrical portion of the holder of each of the plurality of light source units; and
a plurality of springs urging the plurality of light source units to the plurality of mounting surfaces of the casing,
wherein each of the holders includes two projecting portions at one end portion of the holder with respect to a direction of a central axis of the cylindrical portion, the two projecting portions project in a direction perpendicular to the central axis of the cylindrical portion and extend in a direction away from the central axis and each other when viewing the light source unit in a direction of the central axis, with positions of the two projecting portions differing by 180 degrees in a circumferential direction of the cylindrical portion of the holder, and with each of the two projecting portions being provided with a U-shaped cut-away portion.

2. The optical scanning device according to claim 1, wherein a length from the central axis of each cylindrical portion of each holder to a leading end of a projecting portion of each of the projecting portions is shorter than half of a length of a longest straight line of straight lines connecting the central axes of the cylindrical portions of the holders of adjacent light source units held by the mounting surfaces of the casing.

3. The optical scanning device according to claim 1, wherein the plurality of light source units are positioned with respect to the casing in the direction of the central axes by contacting one projecting portion of the two projecting portions to the casing.

4. The optical scanning device according to claim 1, wherein a straight line connecting the two projecting portions provided on one of the light source units is inclined relative to a straight line connecting the central axes of the cylindrical portions of the holders of two of the light sources that are adjacent to each other.

5. The optical scanning device according to claim 4, wherein the straight line connecting the two projecting portions of one of the light source units is substantially parallel to a straight line connecting the central axes of the holders of two of the light sources that are adjacent to each other in a direction diagonal to the casing.

6. The optical scanning device according to claim 1, wherein, with respect to the direction of the central axis of the cylindrical portion, each light source unit is fixed on one end side of the holder that is provided with the projecting portions, and a collimator lens is fixed on the other end side of the holder.

7. The optical scanning device according to claim 1, wherein each of the cut-way portions includes a portion in which a tool for adjusting a beam pitch of the plurality of light emitting points can enter.

8. An image forming apparatus for forming a toner image on a recording material comprising an image forming portion for overlaying toner images that are different in color from each other on the recording material, the image forming portion including:
a plurality of photosensitive members;
the optical scanning device according to claim 1 for irradiating each of the plurality of photosensitive members with the light beams in response to an image information; and
a plurality of developing devices for developing latent images formed on the plurality of the photosensitive members by the optical scanning device with different color toners.

9. An optical scanning device for scanning scanned surfaces with light beams, the optical scanning device comprising:
a first light source unit including a first light source having a plurality of light emitting points for emitting a first light beam and a first holder for holding the first light source;
a second light source unit including a second light source having a plurality of light emitting points for emitting a second light beam and a second holder for holding the second light source;

a third light source unit including a third light source having a plurality of light emitting points for emitting a third light beam and a third holder for holding the third light source;

a fourth light source unit including a fourth light source having a plurality of light emitting points for emitting a fourth light beam and a fourth holder for holding the fourth light source; and a casing of the optical scanning device for holding the first, second, third, and fourth light source units, the casing including a first mounting surface for mounting a cylindrical portion of the first holder of the first light source unit, a second mounting surface for mounting a cylindrical portion of the second holder of the second light source unit, a third mounting surface for mounting a cylindrical portion of the third holder of the third light source unit, and a fourth mounting surface for mounting a cylindrical portion of the fourth holder of the fourth light source unit, wherein, as seen in a direction of a central axis of the cylindrical portion of the first holder, each of the first to fourth holders includes two projecting portions projecting in a direction perpendicular to the direction of the central axis, with positions of the two projecting portions differing by 180 degrees in a circumferential direction of the cylindrical portions, and with each of the two projecting portions being provided with a U-shaped cut-away portion.

10. The optical scanning device according to claim 9, further comprising a first spring urging the first light source unit to the first mounting surface, a second spring urging the second light source unit to the second mounting surface, a third spring urging the third light source unit to the third mounting surface, and a fourth spring urging the fourth light source unit to the fourth mounting surface.

11. The optical scanning device according to claim 9, wherein as seen in the direction of the central axis of the cylindrical portion of the first holder, the first, second, third, and fourth holders are arranged in a point-symmetric relationship with respect to a center of the first, second, third, and fourth holders.

12. The optical scanning device according to claim 11, wherein as seen in the direction of the central axis of the cylindrical portion of the first holder and with respect to a clockwise direction, (i) the first, second, third, and fourth holders are arranged in order of the first holder, the second holder, the third holder, and the fourth holder, (ii) a first line connecting the two projecting portions of the first holder, a second line connecting the two projecting portions of the second holder, a third line connecting the two projecting portions of the third holder, and a fourth line connecting the two projecting portions of the fourth holder are arranged substantially parallel to each other, and the first, second, third, and fourth lines are arranged along a line connecting the first and third holders or a line connecting the second and the fourth holders.

13. The optical scanning device according to claim 9, wherein, with respect to the direction of the central axis of the cylindrical portion of the first holder, each of the first, second, third, and fourth light sources is fixed on one end side of the corresponding one of the first, second, third, and fourth holders that is provided with the projecting portions, and each of a first, second, third, and fourth collimator lens is fixed on the other end side of the corresponding one of the first, second, third, and fourth holders.

14. The optical scanning device according to claim 9, wherein each of the cut-way portions includes a portion in which a tool for adjusting a beam pitch of the plurality of light emitting points can enter.

15. An optical scanning device for scanning scanned surfaces with light beams, the optical scanning device comprising:

a first light source unit including a first light source having a plurality of light emitting points for emitting a first light beam and a first holder for holding the first light source;

a second light source unit including a second light source having a plurality of light emitting points for emitting a second light beam and a second holder for holding the second light source;

a first spring urging the first light source unit to the first mounting surface;

a second spring urging the second light source unit to the second mounting surface; and a casing of the optical scanning device for holding the first and second light source units, the casing including a first mounting surface for mounting a cylindrical portion of the first holder of the first light source unit and a second mounting surface for mounting a cylindrical portion of the second holder of the second light source unit, wherein, as seen in a direction of a central axis of the cylindrical portion of the first holder, each of the first and second holders includes two projecting portions projecting in a direction perpendicular to the direction of the central axis, with positions of the two projecting portions differing by 180 degrees in a circumferential direction of the cylindrical portions, and with each of the two projecting portions being provided with a U-shaped cut-away portion.

16. The optical scanning device according to claim 15, wherein, as seen in the direction of the central axis of the cylindrical portion of the first holder, a first line connecting the two projecting portions of the first holder and a second line connecting the two projecting portions of the second holder are arranged substantially parallel to each other, and the first and second lines are arranged along a direction that is different from both a line connecting the first and second holders and a line perpendicular to the line connecting the first and second holders.

17. The optical scanning device according to claim 15, wherein, with respect to the direction of the central axis of the cylindrical portion of the first holder, each of the first and second light sources is fixed on one end side of the corresponding one of the first and second holders that is provided with the projecting portions, and each of first and second collimator lens is fixed on the other end side of the corresponding one of the first and second holders.

18. The optical scanning device according to claim 15, wherein each of the cut-way portions includes a portion in which a tool for adjusting a beam pitch of the plurality of light emitting points can enter.

\* \* \* \* \*